US012678720B2

(12) United States Patent
Roysdon et al.

(10) Patent No.: US 12,678,720 B2
(45) Date of Patent: Jul. 14, 2026

(54) ELASTOMERIC SEALING SPRING GASKET FOR A FILTER ASSEMBLY

(71) Applicant: Cummins Filtration Inc., Nashville, TN (US)

(72) Inventors: Eric Roysdon, Jamestown, TN (US); Jeff A. Bowerman, Cookeville, TN (US); Adam DeGardeyn, Cookeville, TN (US); Sonia Rajendra Kasbekar, Pune (IN); Aaron M. Wells, Cookeville, TN (US); Mikiya Paul, St. John's, FL (US)

(73) Assignee: Atmus Filtration Inc., Nashville, TN (US)

( * ) Notice: Subject to any disclaimer, the term of this patent is extended or adjusted under 35 U.S.C. 154(b) by 613 days.

(21) Appl. No.: 18/008,488

(22) PCT Filed: Jun. 17, 2021

(86) PCT No.: PCT/US2021/037824
§ 371 (c)(1),
(2) Date: Dec. 6, 2022

(87) PCT Pub. No.: WO2021/257827
PCT Pub. Date: Dec. 23, 2021

(65) Prior Publication Data
US 2023/0338879 A1 Oct. 26, 2023

(30) Foreign Application Priority Data
Jun. 19, 2020 (IN) .............................. 202041025885

(51) Int. Cl.
B01D 35/30 (2006.01)
B01D 29/13 (2006.01)
(Continued)

(52) U.S. Cl.
CPC ............. B01D 35/30 (2013.01); B01D 29/13 (2013.01); B01D 46/0005 (2013.01);
(Continued)

(58) Field of Classification Search
CPC .... B01D 35/30; B01D 29/13; B01D 46/0005; B01D 46/2411; B01D 2201/347;
(Continued)

(56) References Cited

U.S. PATENT DOCUMENTS

| | | |
|---|---|---|
| 3,231,089 A | 1/1966 | Thornton |
| 3,567,023 A | 3/1971 | Buckman et al. |

(Continued)

FOREIGN PATENT DOCUMENTS

| | | |
|---|---|---|
| CN | 102971058 A | 3/2013 |
| WO | 2017106295 A1 | 6/2017 |
| WO | WO-2019/152305 | 8/2019 |

OTHER PUBLICATIONS

International Search Report and Written Opinion issued for PCT Application No. PCT/US2021/037824 issued Sep. 30, 2021, 17 pages.

(Continued)

*Primary Examiner* — Madeline Gonzalez
(74) *Attorney, Agent, or Firm* — Benesch Friedlander Coplan & Aronoff LLP

(57) ABSTRACT

A spin-on filter comprises a housing shell, a filter element, a nutplate, and a gasket. The filter element is positionable within the housing shell and comprises a filter media and an endplate. The nutplate is positionable within the housing shell. The gasket comprises a central body and a spring-loaded extension. The spring-loaded extension circumferentially surrounds and extends radially from the central body. The spring-loaded extension is axially flexible between an expanded position and a compressed position. The spring-
(Continued)

loaded extension forms and maintains a first seal with the endplate and maintains contact with the nutplate as the spring-loaded extension moves between the expanded position and the compressed position.

16 Claims, 9 Drawing Sheets

(51) Int. Cl.
 *B01D 46/00* (2022.01)
 *B01D 46/24* (2006.01)

(52) U.S. Cl.
 CPC .... *B01D 46/2411* (2013.01); *B01D 2201/347* (2013.01); *B01D 2271/027* (2013.01)

(58) Field of Classification Search
 CPC ........ B01D 2271/027; B01D 2201/342; B01D 29/23; B01D 2271/022; B01D 2279/60
 USPC ....... 210/435, 450, 440, 441, 442, 443, 444, 210/455
 See application file for complete search history.

(56) References Cited

U.S. PATENT DOCUMENTS

| | | | |
|---|---|---|---|
| 3,957,640 | A | 5/1976 | Stack |
| 4,052,317 | A | 10/1977 | Palnik |
| 4,106,659 | A | 8/1978 | Dent et al. |
| 4,477,345 | A | 10/1984 | Szlaga, Jr. |
| 4,642,183 | A | 2/1987 | Hebert |
| 4,738,776 | A | 4/1988 | Brown |
| 5,084,162 | A | 1/1992 | Conti |
| 5,362,390 | A | 11/1994 | Widenhoefer et al. |
| 5,399,264 | A | 3/1995 | Pulek et al. |
| 5,445,734 | A | 8/1995 | Chen |
| 5,453,195 | A | 9/1995 | Jorgenson et al. |
| 5,695,637 | A | 12/1997 | Jiang et al. |
| 5,988,399 | A | 11/1999 | Brown et al. |
| 5,996,810 | A | 12/1999 | Bounnakhom et al. |
| 6,019,229 | A | 2/2000 | Rao |
| 6,045,693 | A | 4/2000 | Miller et al. |
| 6,068,763 | A | 5/2000 | Goddard |
| 6,126,823 | A | 10/2000 | Soderlund et al. |
| 6,471,071 | B1 | 10/2002 | Shoaf et al. |
| 6,478,958 | B1 | 11/2002 | Beard et al. |
| 6,571,961 | B2 | 6/2003 | Demirdogen |
| 6,723,239 | B2 | 4/2004 | Maxwell |
| 6,787,033 | B2 | 9/2004 | Beard et al. |
| 6,793,808 | B2 | 9/2004 | Mckenzie |
| 7,410,572 | B2 | 8/2008 | Beard et al. |
| 7,614,504 | B2 | 11/2009 | South et al. |
| 8,435,405 | B2 | 5/2013 | Hussain |
| 9,095,795 | B2 | 8/2015 | Ahuja et al. |
| 9,545,587 | B2 | 1/2017 | Tucker et al. |
| 9,670,888 | B2 | 6/2017 | Jiang et al. |
| 10,046,256 | B2 | 8/2018 | Tucker et al. |
| 10,118,114 | B2 | 11/2018 | Hawkins et al. |
| 2002/0185454 | A1 | 12/2002 | Beard et al. |
| 2004/0050766 | A1 | 3/2004 | Jiang |
| 2005/0161378 | A1 | 7/2005 | Cline |
| 2007/0235375 | A1* | 10/2007 | Stanhope ............. B01D 27/106 210/450 |
| 2010/0044293 | A1 | 2/2010 | Fisher et al. |
| 2018/0056218 | A1 | 3/2018 | Fasold et al. |

OTHER PUBLICATIONS

Filter Navistar 2611236/C1—International Element Extended; FinditParts Inc., 2022 https://www.finditparts.com/products/2915633/navistar-2611236c1?s_s=NAVISTAR%202611236C1&sctx=eyJzljoiTkFWSVNUQVlgMjYxMTIzNkMxliwic291cmNIljoic2VhcmNocGFnZSIsInByb2R1Y3RfaWQiOilyOTE1NjMzliwicmVzdWx0X2NvdW50ljo1LCJyZXN1bHRfaWR4ljowfQ==&ga_list=Search%20Results%20V3, 3 pages.

First Examination Report issued for Indian Patent Application No. 202247063854, issued Jan. 23, 2023, 5 pages.

Office Action issued in Chinese Application No. 202180037515.7, dated Nov. 28, 2025.

* cited by examiner

ELASTOMERIC SEALING SPRING GASKET FOR A FILTER ASSEMBLY

CROSS-REFERENCE TO RELATED PATENT APPLICATIONS

This application is a national phase application based on PCT Application No. PCT/US2021/037824, filed Jun. 17, 2021, which claims priority to and the benefit of Indian Provisional Patent Application No. 202041025885, filed Jun. 19, 2020. The contents of these applications are incorporated herein by reference in their entirety.

FIELD

The present application relates generally to filtration system for filtering a fluid.

BACKGROUND

Internal combustion engines generally combust a mixture of fuel (e.g., gasoline, diesel, natural gas, etc.) and air. Lubrication oil is also supplied to the engine to lubricate the various moving components of the engine. Either prior to entering the engine or during engine operation, the intake air, fuel, lubrication oil, and other fluids are typically passed through filter assemblies to remove contaminants (e.g., dust, water, oil, etc.) from the fluids. The filter assemblies include filter elements having filter media. As the fluid passes through the filter media, the filter media removes at least a portion of the contaminants in the fluid. Some filter assemblies, such as fuel and oil filtration systems, often use spin-on filter assemblies. The spin-on filter assemblies house the filter element and are spun on to a filter mounting head to attach the filter assembly to the filtration systems.

Various filter assemblies, in particular fluid filter assemblies with spin-on fluid filters, comprise a nutplate positioned on an end of the filter assembly, with such nutplates providing a mechanism (such as internal threading) for coupling of a filter head to a first end of the housing of the spin-on filter, or coupling of a cover or bowl to a second end of the filter housing.

As a result of height variations between different components within the filter assembly (in particular within spin-on filter assemblies), a spring may be required to ensure proper compression and sealing between the filter element and the nutplate. For example, a compression spring may be used to accommodate stack-up tolerance within the filter assembly. However, due to geometrical and architectural constraints within certain applications of filter assemblies (such as fuel-water separators and filters used for air, lube, coolant, etc.), some filter assemblies are unable to use a conventional compression spring to accommodate any stack-up tolerance.

In addition to the stack-up tolerance, sealing must be provided in the region between the head and the spin-on filter to prevent leakage outside the filter to environment and provided between the flow inlet and the flow exit to prevent leakage of unfiltered fluid from the inlet to the filtered fluid outlet. In particular, the filter assemblies form various seals (in the region of the filter element endplate, the spin-on nutplate, and/or the filter head outlet pipe (e.g., the "spud")) to fluidly separate the filtered fluid from the unfiltered fluid.

SUMMARY

Various embodiments provide for a spin-on filter that comprises a housing shell, a filter element, a nutplate, and a gasket. The filter element is positionable within the housing shell and comprises a filter media and an endplate. The nutplate is positionable within the housing shell. The gasket comprises a central body and a spring-loaded extension. The spring-loaded extension circumferentially surrounds and extends radially from the central body. The spring-loaded extension is axially flexible between an expanded position and a compressed position. The spring-loaded extension forms and maintains a first seal with the endplate and maintains contact with the nutplate as the spring-loaded extension moves between the expanded position and the compressed position.

Various other embodiments provide for a gasket for a spin-on filter. The gasket comprises a central body and a spring-loaded extension. The spring-loaded extension circumferentially surrounds and extends radially from the central body. The spring-loaded extension is axially flexible between an expanded position and a compressed position. The spring-loaded extension forms and maintains a first seal with a first component of the spin-on filter and contacts a second component of the spin-on filter as the spring-loaded extension moves between the expanded position and the compressed position.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to an elastomeric sealing spring gasket for a filter assembly. As one single, unitary component, the gasket addresses both the stack-up tolerance accommodation needs of the filter assembly (by functioning as a spring) and the sealing needs of the filter assembly (by forming multiple seals within the filter assembly).

By functioning as a biasing member, the gasket can absorb a broad tolerance of stack heights and therefore reduce the need for overly tight tolerances for vertically stacking components (on critical components and sub-assemblies). Accordingly, with the gasket (which function as both a biasing member and a seal, as described further herein), the component, manufacturing, and overall cost within the filter assembly is reduced and various constraints on manufacturing and quality control are eased (while still providing a fully-functional filter assembly). Additionally, the gasket eliminates the need for a separate coil spring within the filter assembly to accommodate vertical stack-up and eliminates the need for static sealing components (such as lathe-cut gaskets and radial and face-sealing O-rings).

Figure 1A:
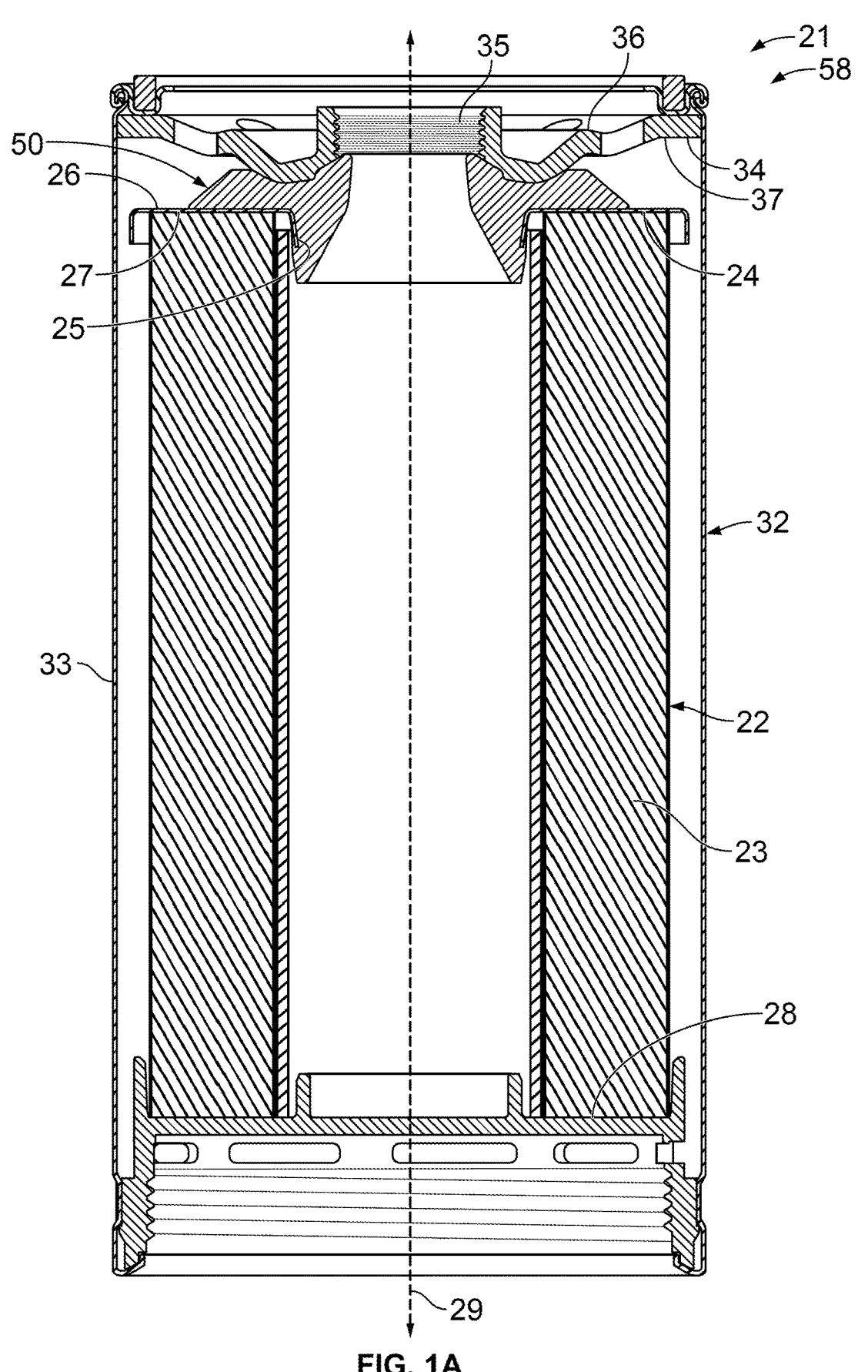
FIG. 1A is a cross-sectional view of a spin-on filter according to one embodiment.
Figure 1B:
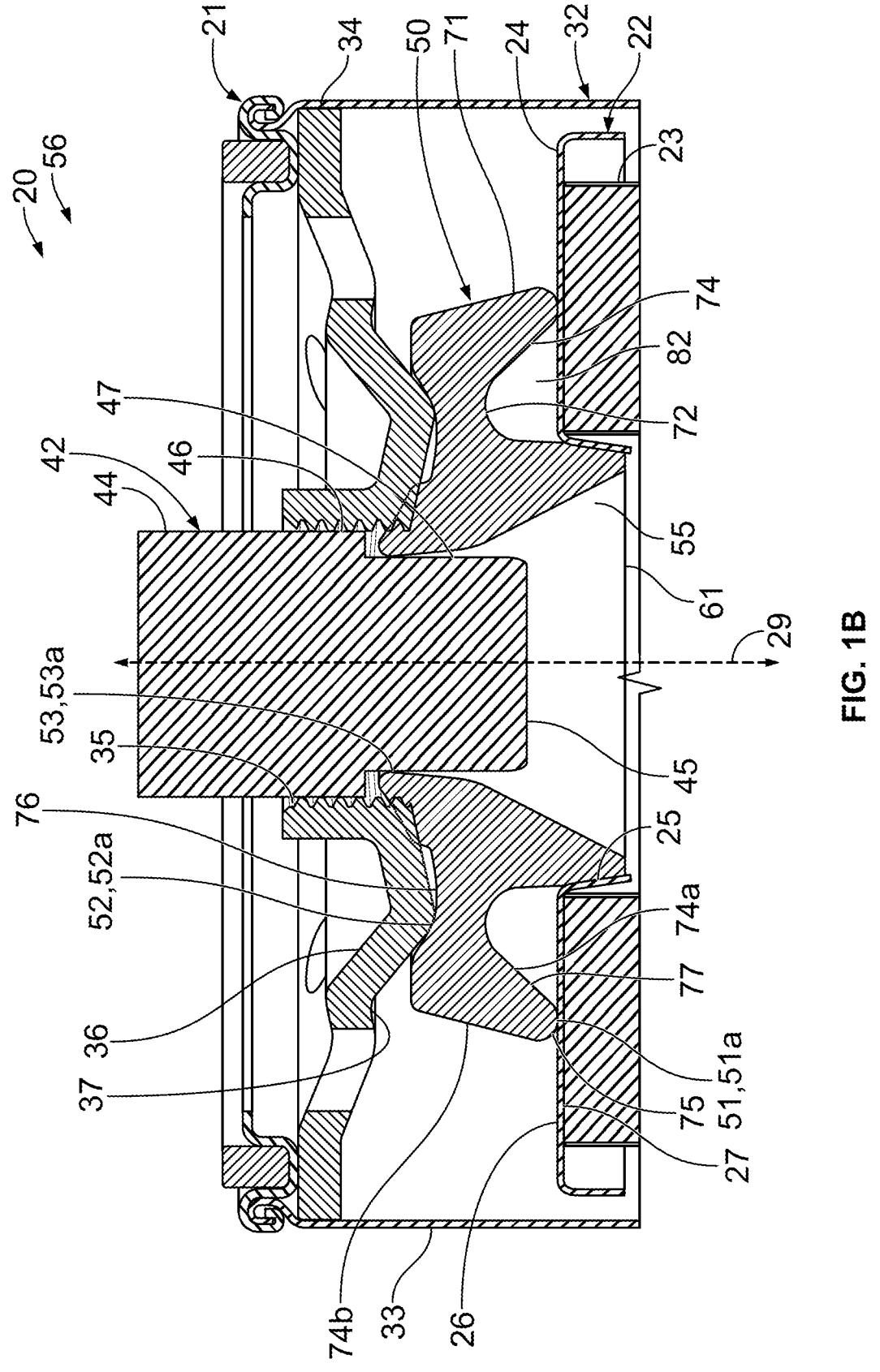
FIG. 1B is a cross-sectional view of a portion of the filter assembly with the spin-on filter of FIG. 1A with a gasket of the spin-on filter in an expanded position.
Figure 1C:
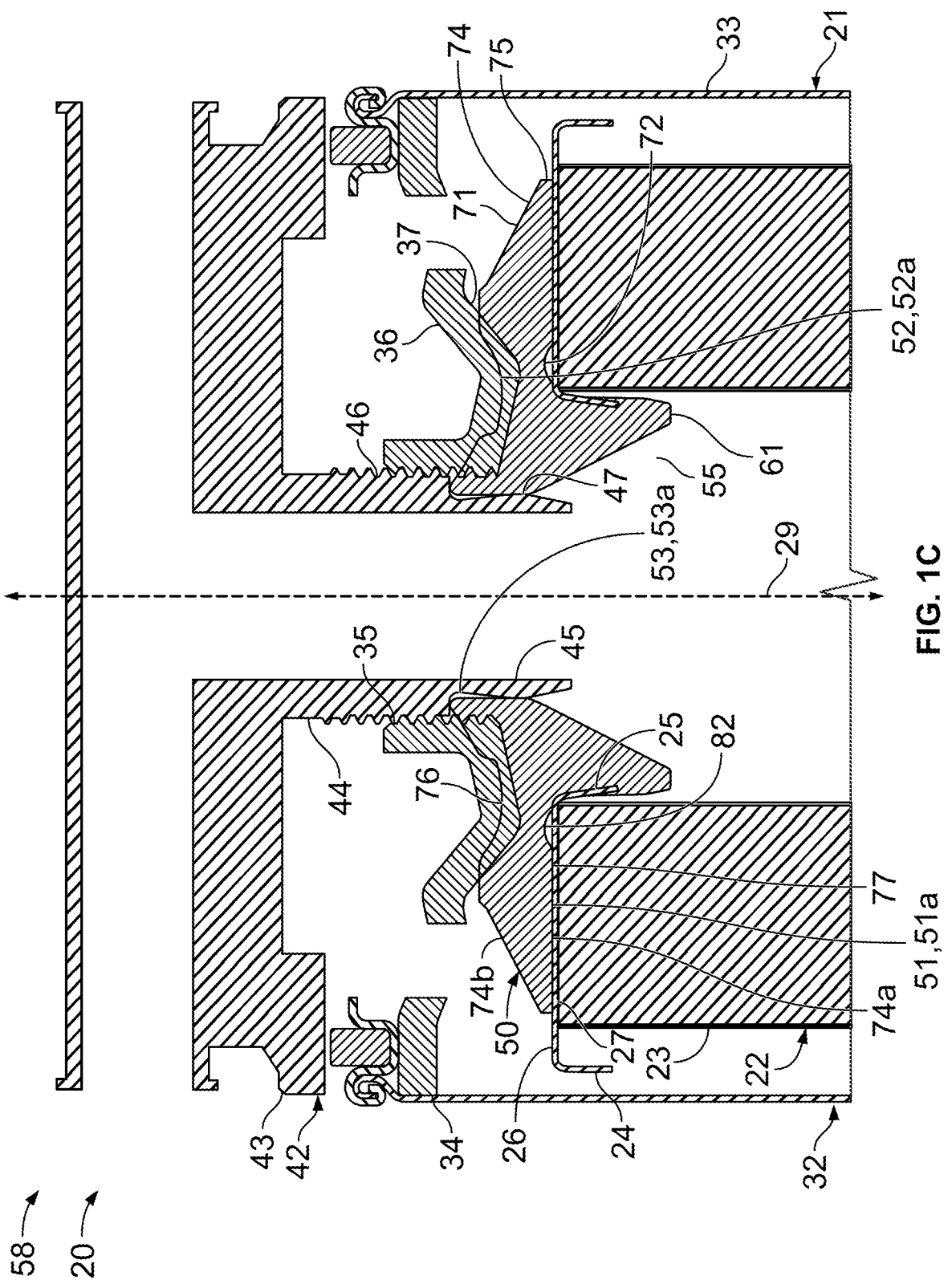
FIG. 1C is a cross-sectional view of a portion of the filter assembly of FIG. 1B with the gasket in a compressed position.

FIG. 1A shows a spin-on filter 21 according to one embodiment. FIGS. 1B-1C show an example of a portion of a filter assembly 20 comprising the spin-on filter 21 and a filter head 42. The spin-on filter 21 is attachable to the filter head 42 (via, for example, the nutplate 34 of the spin-on filter 21 and the spud 44 of the filter head 42). As shown in FIG. 1A, the spin-on filter 21 comprises a filter element 22, a filter housing 32, a nutplate 34, and a sealing spring gasket 50. The filter assembly 20 (in particular the filter element 22 of the spin-on filter 21) is configured to filter a fluid. According to one embodiment, the filter assembly 20 may be a fuel-water separator, a spin-on filter assembly, or a dome filter. According to various embodiments, the filter assembly 20 may be used with a 13 or 15 liter engine. The filter assembly 20 may filter a variety of different fluids, including but not limited to air, lube, and coolant.

As shown in FIG. 1A, the filter element 22 is positionable within the housing shell 33 of the housing 32. The filter element 22 comprises a filter media 23, a lower endplate 28, and an upper endplate 24. The filter media 23 is configured to filter a fluid.

The lower endplate 28 and the upper endplate 24 are each positioned along opposite axial ends of the filter media 23. The upper endplate 24 comprises a top surface 26 and a bottom surface 27 that are opposite each other. The top surface 26 of the upper endplate 24 faces axially away from the filter media 23 and is configured to abut and form a seal with the gasket 50 (as described further herein). The bottom surface 27 of the upper endplate 24 faces axially toward and is configured to abut the filter media 23.

The endplate 24 defines an endplate center opening or through-hole 25 through which unfiltered fluid can flow into or filtered fluid out from the center of the filter media 23 (to be filtered or just after filtration, respectively). The endplate 24 may have an axial extension with an inner surface defining the endplate through-hole 25. The axial extension may extend axially below and in a direction away from the top surface 26 of the endplate 24. The axial extension may be positioned at least partially within an inner central area of the filter media 23.

The housing 32 is configured to receive and contain the filter element 22. The housing 32 comprises a housing shell or body 33. The housing shell 33 at least circumferentially surrounds the filter element 22. The filter media 23 (and optionally the entire filter element 22) may fit entirely within the housing shell 33.

The nutplate 34 is positionable within the housing shell 33 and extends along an open end of the housing shell 33 and is positioned at least partially or completely within the housing shell 33, abutting against an inner surface of the housing shell 33. When the filter assembly 20 is assembled, the nutplate 34 is positioned axially between the open end of the housing shell 33 and the endplate 24 of the filter element 22. The nutplate 34 comprises a top surface 36 and a bottom surface 37 that are opposite each other. The top surface 36 faces axially away from the filter element 22 and the gasket 50 and faces axially toward the body 43 of the filter head 42 (as shown in FIG. 1C). The bottom surface 37 faces axially toward and is configured to abut and form a seal with the gasket 50 (as described further herein).

The nutplate 34 defines a nutplate center opening or through-hole 35 through which unfiltered fluid can flow into or filtered fluid out from the center of the filter media 23 (to be filtered or just after filtration, respectively). The nutplate through-hole 35 is configured to at least partially receive the spud 44 of the filter head 42 such that the spud 44 extends completely through the nutplate through-hole 35, as shown in FIGS. 1B-1C. The nutplate 34 may have an axial extension with an inner surface defining the nutplate through-hole 35. The axial extension may extend axially above and in a direction away from the bottom surface 37 of the nutplate 34. The inner surface of the axial extension may include threads to threadably attach to the outer surface of the spud 44.

The filter head 42 may be part of or otherwise attached to an engine. The spin-on filter 21 is attachable to the filter head 42 such that the open end of the housing shell 33 is closed off by the filter head 42. As shown in FIG. 1C, the filter head 42 comprises a body 43 extending radially over the open end of the housing shell 33 and a module inlet or outlet pipe or spud 44 (which may be referred to as the "third component") extending axially from the body 43. The body 43 is positioned outside of the housing shell 33, while the spud 44 is positioned and extends at least partially within the housing shell 33. The nutplate 34 is positioned axially between the body 43 of the filter head 42 and the endplate 24.

The spud 44 extends axially from an inner or lower surface of the body 43 of the filter head 42, at least partially into (and optionally through) the nutplate through-hole 35 and the gasket through-hole 55 (as described further herein). The spud 44 defines a spud center opening or through-hole 45 through which unfiltered fluid can flow into or filtered fluid out from the center of the filter media 23 (to be filtered or just after filtration, respectively).

As shown in FIGS. 1B-1C, the spud 44 comprises a base portion 46 and an end portion 47 (that the through-hole 45 extends completely though). The base portion 46 is axially closer to the body 43 of the filter head 42 than the end portion 47 of the spud 44 (and the end portion 47 is axially further from the body 43 of the filter head 42 than the base portion 46 of the spud 44). The outer surface of the base portion 46 of the spud 44 includes threads that are configured to threadably engage with threads on the inner surface of the axial extension of the nutplate 34, along the nutplate through-hole 35, thereby attaching and securing the spin-on filter 21 to the filter head 42. The end portion 47 of the outer surface of the spud 44 does not have threads (according to one embodiment) and is configured to extend into the gasket through-hole 55 to abut and form a radial seal with the inner surface of the gasket through-hole 55 (as described further herein).

When the spin-on filter 21 is assembled, the endplate through-hole 25, the nutplate through-hole 35, the spud through-hole 45, and the gasket through-hole 55 (as well as the spud through-hole 45) are all axially aligned with each other and share a common central axis 29, thereby forming a pathway for fluid to flow unobstructed between the center of the filter media 23 and the filter head 42. Furthermore, the endplate 24, the gasket 50, and the spud 44 are all positioned along the same side (e.g., the upper side) of the filter media 23.

As shown in FIGS. 1B-1C, the gasket 50 is a geometrically flexible, elastomeric component spanning a gap between two or more other components within the filter assembly 20 that are aligned along the same axis. As used herein, "gasket" refers to a shaped piece of material or part used to form a seal between component surfaces.

The gasket 50 is positioned axially between the endplate 24 of the filter element 22 and the nutplate 34. Due to the geometry and material of the gasket 50, the gasket 50 is configured to move and flex between an expanded position 56 (as shown in FIG. 1B) and a compressed position 58 (as shown in FIG. 1C), as described further herein. Accordingly, as described further herein, the gasket 50 is configured to function as a biasing member (in particular a compression spring) within the spin-on filter 21 by being geometrically flexible and compressible, which allows the gasket 50 to form and maintain radial and/or axial seals with each of the endplate 24, the nutplate 34, and the spud 44 over a range of different axial gaps between the filter element 22 and the filter head 42 and while being moved between a minimum compression (i.e., the expanded position 56) and a maximum compression (i.e., the compressed position 58). The gasket 50 reduces the cost of the filter assembly 20 by both being usable as a biasing member and forming seals within a wide tolerance range of axial distances between the filter element 22 and the filter head 42. Furthermore, by providing two functions (i.e., a sealing gasket and a biasing member) in one component, the gasket 50 thus reduces the number of required components within (and therefore also the cost of) the filter assembly 20.

The gasket 50 is constructed as a single-piece that provides multiple functions (i.e., spring and sealing functionality). Accordingly, the gasket 50 comprises a single, integral, unitary component that cannot be separated without destruction. The entire gasket 50 may be a molded component. The gasket 50 may be constructed out of a variety of different elastomeric materials, including but not limited to nitrile.

Figure 2A:
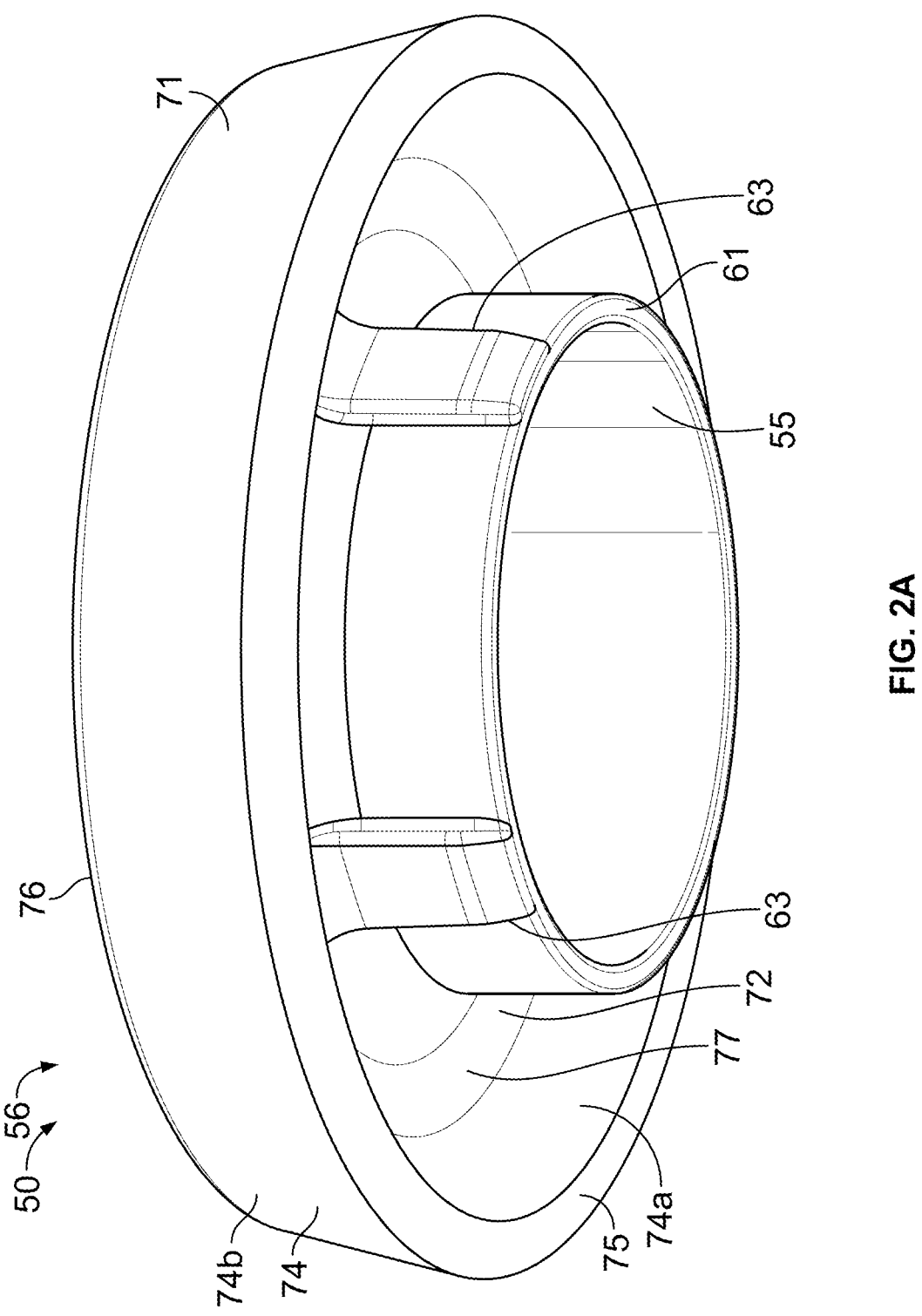
FIG. 2A is a perspective view of the gasket of the spin-on filter of FIG. 1B.
Figures 2B, 3A:
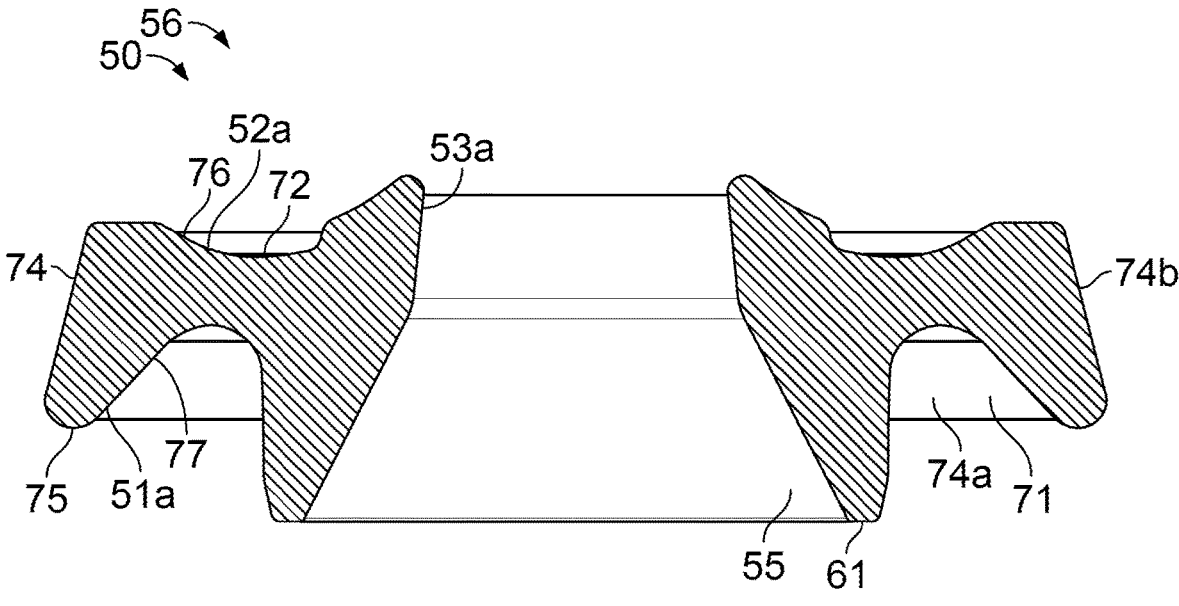
FIG. 2B is a cross-sectional view of the gasket of FIG. 2A.
FIG. 3A is a cross-sectional view of a portion of the filter assembly of FIG. 1B with the gasket in the expanded position.

As shown in FIGS. 2A-2B, the gasket 50 comprises an axially-extending central body 61 and a spring-loaded extension 71. The central body 61 and the spring-loaded extension 71 are attached or joined together along their radially outer and inner surfaces, respectively, as described further herein. The gasket 50 also comprises a first sealing region 51a, a second sealing region 52a, and a third sealing region 53a (as shown in FIG. 2B) that are configured to form and maintain the first seal 51, the second seal 52, and the third seal 53, as described further herein. The central hub, skirt, or body 61 of the gasket 50 defines a gasket center opening or through-hole 55 through which unfiltered fluid can flow into or filtered fluid out from the center of the filter media 23 (to be filtered or just after filtration, respectively). The center axis of the gasket through-hole 55 is axially aligned with the respective center axes of the endplate through-hole 25, the nutplate through-hole 35, and the spud through-hole 45 (along the center axis 29).

In the embodiment of FIGS. 2A-2B, the central body 61 is axially longer (i.e., extends axially above and below) than the spring-loaded extension 71 in order to form the third seal 53 with the spud 44 (as described further herein) and to extend axially into the endplate through-hole 25. Accordingly, the central body 61 comprises a bottom or lower portion (extending axially below the flexible portion 72 of the spring-loaded extension 71) and a top or upper portion (extending axially above the flexible portion 72 of the spring-loaded extension 71). At least a portion of the lower portion of the central body 61 extends into and is positioned within the endplate through-hole 25, and at least a portion of the upper portion of the central body 61 extends into and is positioned within the nutplate through-hole 35.

The third sealing region 53a (as shown in FIG. 2B) extends along and is defined by the inner surface of the upper portion of the central body 61 (that defines the gasket through-hole 55). The gasket 50 is configured to form the third seal 53 anywhere along the length of the third sealing region 53a (i.e., anywhere along the length of the inner surface of the upper portion of the central body 61), depending on the position of the gasket 50 (i.e., the expanded position 56, the compressed position 58, or a position therebetween). The third sealing region 53a extends completely around the gasket through-hole 55 to form a perimeter seal (that is the third seal 53).

Figure 4:
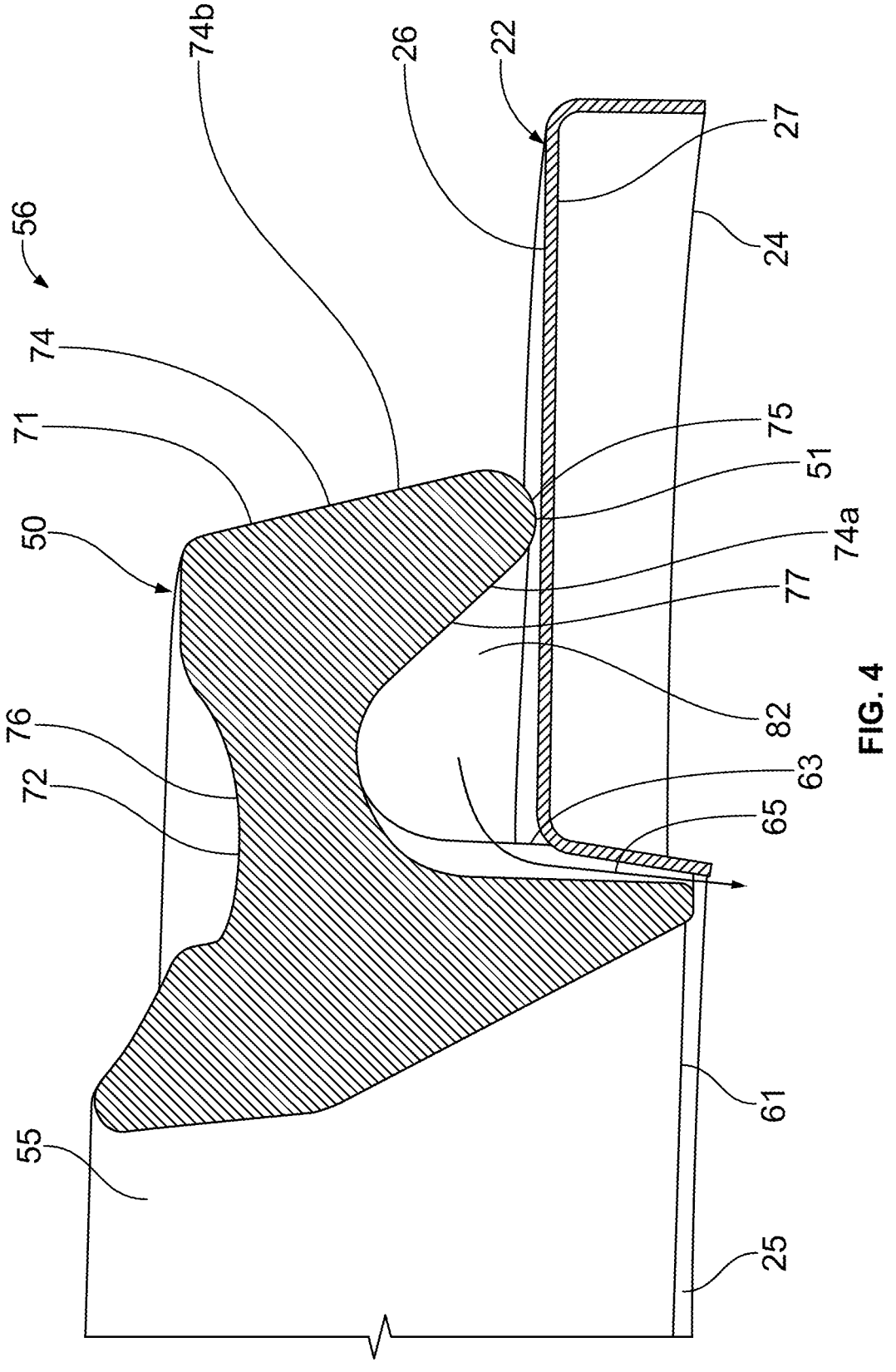
FIG. 4 is a cross-sectional view of the gasket and the endplate of the spin-on filter of FIG. 1A with the gasket in the expanded position.

As shown in FIGS. 2A and 4-5B, the central body 61 comprises at least one vertically- or axially-extending rib 63 (preferably a plurality of ribs 63) extending along a portion of the axial length of the central body 61 (along the outer surface of the lower portion of the central body 61). Each rib 63 extends radially outwardly from the outer surface of the central body 61. The plurality of ribs 63 are positioned intermittently about the outer surface of the central body 61. The ribs 63 are configured to directly contact or abut the inner surface of the endplate 24 defining the endplate through-hole 25 (as shown in FIG. 4). Accordingly, the ribs 63 interpose or are positioned radially between the outer surface of the central body 61 and the inner surface of the endplate 24. The ribs 63 are configured to space apart or form a gap 65 that extends radially between the outer surface of the central body 61 and the inner surface of the endplate 24 and axially along at least a portion of the axial length of the ribs 63. The shape and number of ribs 63 depends on the desired friction reduction and the desired mating component fit.

The ribs 63 are relief features that radially space apart the outer surface of the central body 61 from the inner surface of the endplate 24 to form a fluid passage therebetween. Accordingly, the ribs 63 allow fluid (e.g., air) to flow axially within the gap 65 (as described further herein) along the axial length of the ribs 63, radially between the outer surface of the lower portion of the central body 61 and the inner surface of the endplate 24, in particular as the gasket 50 is moved between the expanded position 56 and the compressed position 58. This passage of fluid prevents a suction or vacuum effect within the channel 82 (between the gasket 50 and the endplate 24), as described further herein. By preventing suction within the channel 82, the gasket 50 can effectively move and function as a biasing member.

The ribs 63 also enable more freedom of axial movement (of the gasket 50 relative to the endplate 24) by reducing friction between the respective mating surfaces of the gasket 50 and the endplate 24, which maintains the spring functionality of the gasket 50 and prevents mechanical binding of the elastomeric material to the inner surfaces of the endplate 24 (along the endplate through-hole 25). This reduction in friction is particularly beneficial when the gasket 50 is fully compressed in the compressed position 58 or is compressed through a large percentage of its axial range. Due to the compressive stresses in these situations, the elastomeric material of the gasket 50 may expand the outer diameter of the lower portion of the central body 61 to be radially larger than the diameter of the endplate through-hole 25. Without the ribs 63, such an expansion may otherwise result in a mechanical hold of the gasket to the inner surface of the endplate 24. The ribs 63 reduce the effects of this material surface interference by reducing the surface contact of the gasket 50 to the inner surface of the endplate 24.

Figure 5A:
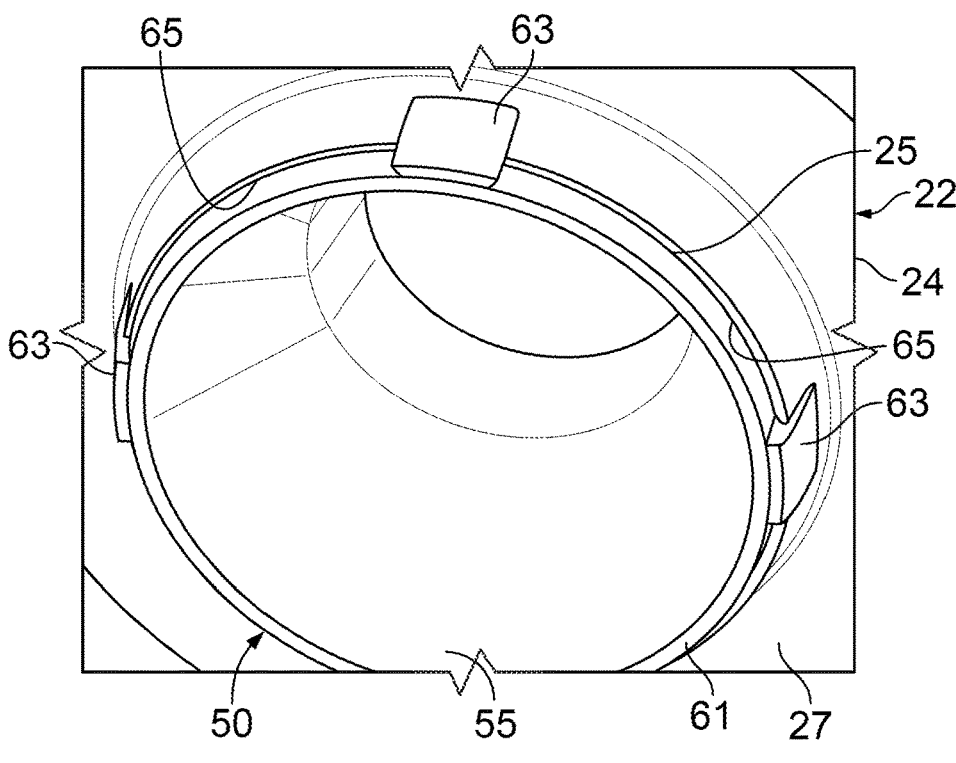
FIG. 5A is a bottom, perspective view of the gasket and the endplate of the spin-on filter of FIG. 1A.
Figure 5B:
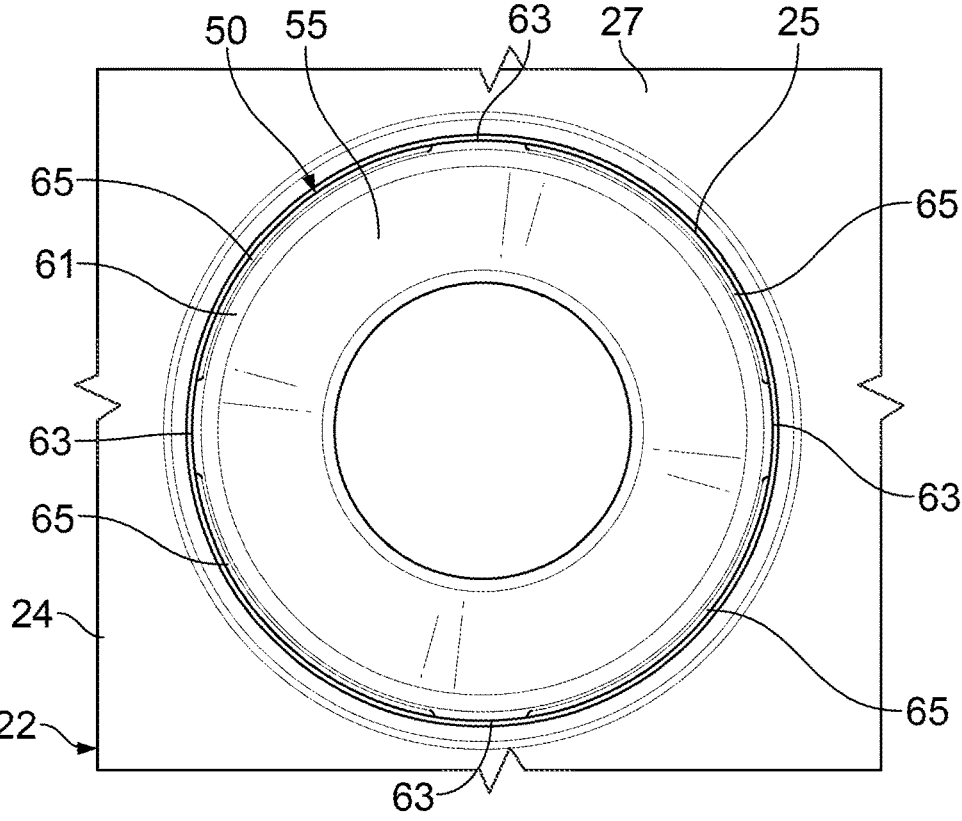
FIG. 5B is a bottom view of the gasket and the endplate of the spin-on filter of FIG. 1A.

The ribs 63 also maintain a concentric location of the gasket 50 relative to the mating components (e.g., the endplate 24, the nutplate 34, and the spud 44). In particular, the ribs 63 axially center and locate the gasket 50 about the center axis of the endplate 24. Accordingly, the center axis of the endplate 24 (and the center of the endplate through-hole 25) is aligned with the central axis 29 shown in FIGS. 1A-1C and the lower portion of the central body 61 (and the gasket through-hole 55) is concentric within the axial extension of the endplate 24 (defining the endplate through-hole 25), as shown in FIG. 5B.

To avoid undue or excessive contraction or expansion of the inner diameter of the central body 61 (i.e., of the gasket through-hole 55) (which forms the third seal 53, as described further herein) as the gasket 50 is axially compressed toward the compressed position 58, the upper portion of the central body 61 is tapered, as shown in FIG. 2B. As shown in FIG. 3A, the outer surface of the upper portion of the central body 61 contacts the nutplate 34 and the inner surface of the upper portion of the central body 61 contacts (and forms the third seal 53 with) the spud 44. In particular, as the upper portion of the central body 61 extends axially above the top surface 76 of the spring-loaded extension 71 (as described further herein), the upper portion of the central body 61 tapers such that the thickness of the central body 61 axially above the spring-loaded extension 71 is smaller than the thickness of the central body 61 that is radially aligned with the spring-loaded extension 71. Accordingly, as shown in FIG. 2B, the central body 61 tapers radially outwardly (and increases in thickness) from the top end of the upper portion of the central body 61 to the connection between the central body and the spring-loaded extension 71.

Furthermore, as shown in FIG. 2B, the lower portion of the central body 61 is also tapered. As shown in FIG. 3A, the outer surface of the lower portion of the central body 61 contacts the inner surface of the endplate 24 (that defines the endplate through-hole 25). As the lower portion of the central body 61 extends axially below the bottom surface 77 of the spring-loaded extension 71 (as described further herein), the lower portion of the central body 61 tapers such that the thickness of the central body 61 radially below the spring-loaded extension 71 is smaller than the thickness of the central body 61 that is axially aligned with the spring-loaded extension 71. Accordingly, as shown in FIG. 2B, the central body 61 tapers radially outwardly (and increases in thickness) from the bottom end of the lower portion of the central body 61 to the connection between the central body and the spring-loaded extension 71.

As shown in FIG. 2B, to connect or join the central body 61 and the spring-loaded extension 71 together, a radially-inner surface of the spring-loaded extension 71 (i.e., a radially-inner end of the flexible portion 72) extends from a radially-outer surface of the central body 61, at a location axially between the upper portion and the lower portion of the central body 61. The joint or connection between the central body 61 and the spring-loaded extension 71 may be tapered (along both the top surface and the bottom surface of the flexible portion 72) such that the thickness of the flexible portion 72 is gradually reduced as the flexible portion 72 extends radially outward from the central body 61 to a central portion of the flexible portion 72. However, as described further herein, the gasket 50 as a whole (which includes the central body 61 and the spring-loaded extension 71) is a single, integral component.

As shown in FIGS. 2A-2B, the spring-loaded extension 71 of the gasket 50 circumferentially surrounds and extends radially from the central body 61. Due to the geometry and material of the spring-loaded extension 71, the spring-loaded extension 71 is axially flexible between the expanded position 56 and the compressed position 58 (as described further herein). The spring-loaded extension 71 is biased to move from the compressed position 58 toward the expanded position 56. The spring-loaded extension 71 comprises a top surface 76 and a bottom surface 77 that are opposite each other. The top surface 76 faces axially toward the nutplate 34, and the bottom surface 77 faces axially toward the endplate 24.

The spring-loaded extension 71 is tapered along the radial length of the flexible portion 72. In particular, the joint or connection between the flexible portion 72 and the circumferential lip 74 is tapered (along both the top surface 76 and the bottom surface 77 of the flexible portion 72) such that the thickness of the flexible portion 72 is gradually increased as the flexible portion 72 extends radially outward (from the central portion of the flexible portion 72) to the circumferential extension 71. Accordingly, a central portion of the flexible portion 72 is thinner than its radially inner end and its radially outer end.

As shown in FIG. 2B, the top surface 76 of the spring-loaded extension 71 extends along the top surface of the circumferential lip 74 and the top surface of the flexible portion 72 (in reference to when the gasket is in the compressed position 58). The second sealing region 52a (as shown in FIG. 2B) extends along (and is defined by) the top surface 76 of the spring-loaded extension 71 (along the respective top surfaces of the circumferential lip 74 and the flexible portion 72). The gasket 50 is configured to form the second seal 52 anywhere along the second sealing region 52a (e.g., along the top surface of the circumferential lip 74 and/or the top surface of the flexible portion 72), depending on the position of the gasket 50 (i.e., the expanded position 56, the compressed position 58, or a position therebetween). The second sealing region 52a extends completely around the inner portion of the gasket 50 (i.e., around the central body 61) to form a perimeter seal (that is the second seal 52).

To form and maintain the second seal 52 as the gasket 50 moves between the expanded position 56 and the compressed position 58 (as described further herein), the top surface 76 (and the second sealing region 52a) is curved, tapered, or radiused, sloping axially downwardly (in a direction toward the bottom surface 77) along its radial length and along the flexible portion 72 in the expanded position 56. Accordingly, the top surface 76 (and the second sealing region 52a) is concave along at least a portion of its radial length in the expanded position 56.

As shown in FIG. 2B, the bottom surface 77 of the spring-loaded extension 71 extends along the end 75 and the inner surface 74a of the circumferential lip 74 and along the bottom surface of the flexible portion 72. The first sealing region 51a (as shown in FIG. 2B) extends along (and is defined by) the bottom surface 77 of the spring-loaded extension 71 (including the end 75) (along the bottom surface of the circumferential lip 74 and optionally also the bottom surface of the flexible portion 72). The gasket 50 is configured to form the first seal 51 anywhere along the first sealing region 51a (e.g., along the bottom surface of the circumferential lip 74 and/or the bottom surface of the flexible portion 72), depending on the position of the gasket 50 (i.e., the expanded position 56, the compressed position 58, or a position therebetween). The first sealing region 51a extends completely around the inner portion of the gasket 50 (i.e., around the central body 61) to form a perimeter seal (that is the first seal 51).

To form and maintain the first seal 51 as the gasket 50 moves between the expanded position 56 and the compressed position 58 (as described further herein), the bottom surface 77 (and the first sealing region 51a) is curved, tapered, or radiused, sloping axially upwardly (in a direction toward the top surface 76) along its radial length and along the flexible portion 72 in the expanded position 56. Accordingly, the bottom surface 77 (and the first sealing region 51a) is concave along at least a portion of its radial length in the expanded position 56.

Figure 3B:
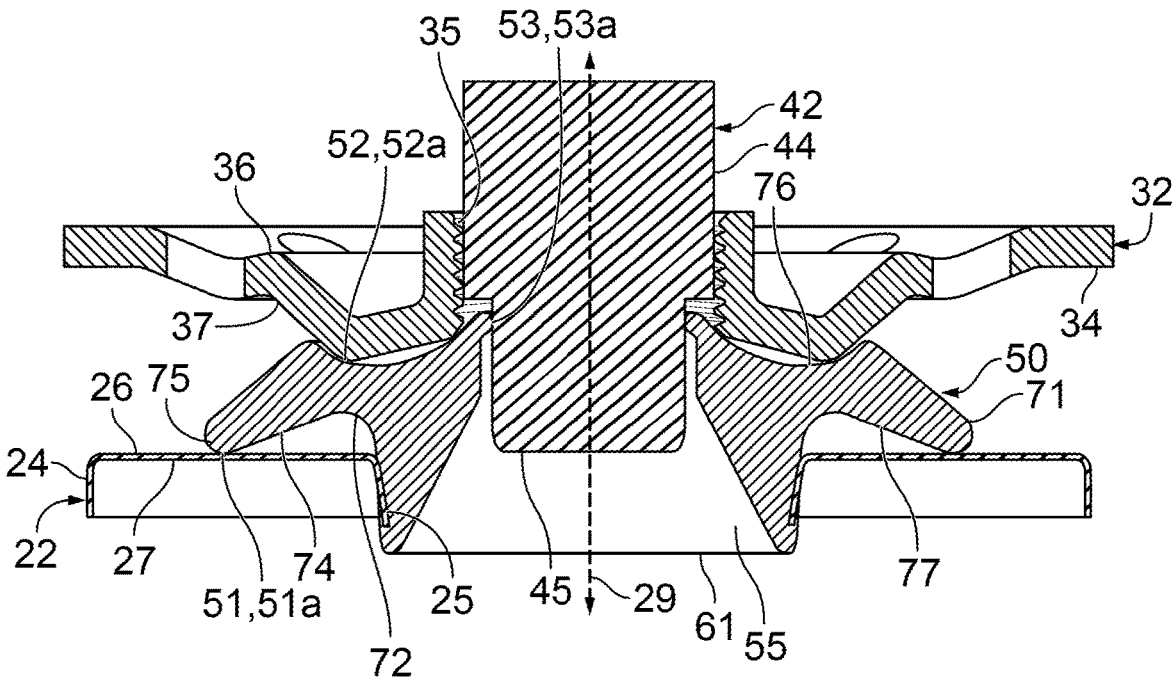
FIG. 3B is a cross-sectional view of a portion of the filter assembly of FIG. 1B with the gasket in a position between the expanded position and the compressed position.
Figure 3C:
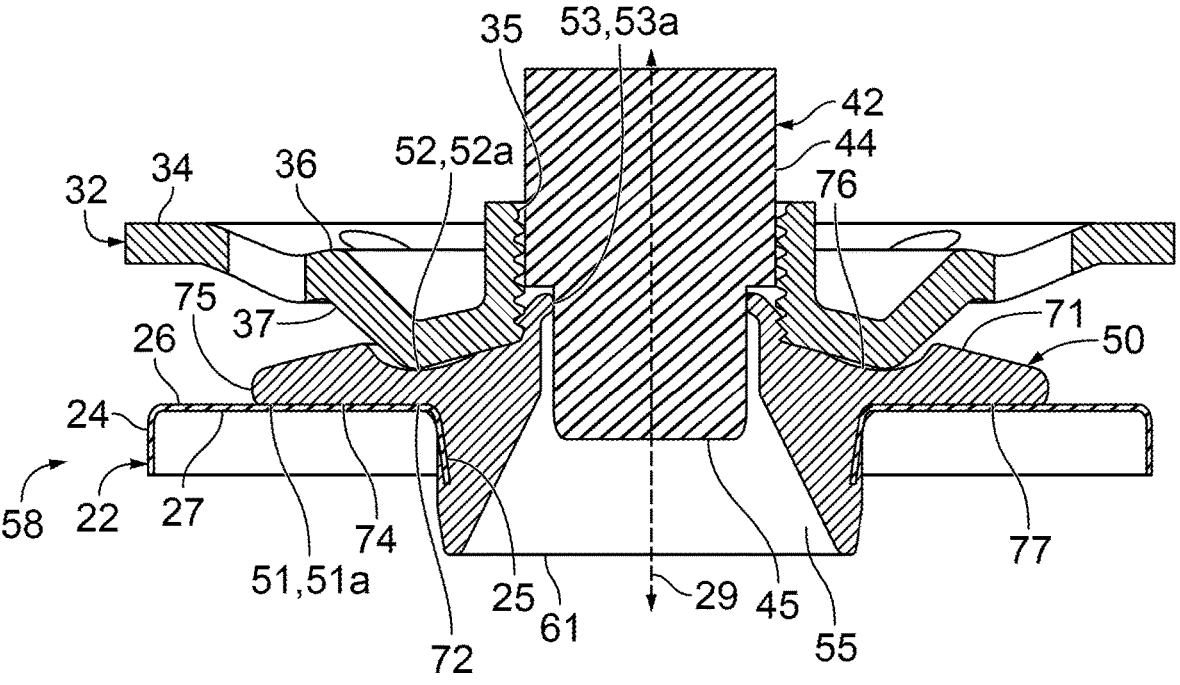
FIG. 3C is a cross-sectional view of a portion of the filter assembly of FIG. 1B with the gasket in the compressed position.

The spring-loaded extension 71 comprises a deformable or flexible portion 72 and a circumferential lip 74. The flexible portion 72 is a thinned region of the spring-loaded extension 71 that moves, flexes, or deforms as the gasket 50 moves between the expanded position 56 and the compressed position 58. The flexible portion 72 extends radially from and circumferentially surrounds the central body 61, and the circumferential lip 74 extends radially from and circumferentially surrounds the flexible portion 72 (such that the flexible portion 72 is positioned radially between and connects the central body 61 and the circumferential lip 74). As shown in FIG. 3A, in the expanded position 56, a body of the circumferential lip 74 extends axially below the flexible portion 72, as described further herein. As shown in FIG. 3C, in the compressed position 58, the flexible portion 72 is deformed such that the body of the circumferential lip 74 is approximately radially aligned with the flexible portion 72.

The flexible portion 72 is axially thinner than the circumferential lip 74 and the central body 61 (in both the expanded position 56 and the compressed position 58), which allows the flexible portion 72 to flex or deform (to thus allow the gasket 50 to move between the expanded position 56 and the compressed position 58). Accordingly, as the gasket 50 is compressed and moves from the expanded position 56 to the compressed position 58, the gasket 50 primarily flexes along the flexible portion 72 (although other portions of the gasket 50 may also flex and deform). As the flexible portion 72 flexes to move the gasket 50 from the expanded position 56 to the compressed position 58, the flexible portion 72 rotates or moves circumferential lip 74 from an axially-extending position to a radially-extending position (as shown in FIGS. 3A-3C and described further herein).

As shown in FIG. 2B, when the gasket 50 is in the expanded position 56. The circumferential lip 74 extends axially above and below the flexible portion 72 and is therefore axially thicker than the flexible portion 72 to give the gasket 50 (in particular the spring-loaded extension 71) sufficient structure and support. As shown in FIGS. 3A-3C, as the flexible portion 72 flexes and moves, the circumferential lip 74 moves between the axially-extending position (when the gasket 50 is in the expanded position 56) and the radially-extending position (when the gasket 50 is in the compressed position 58), thus allowing the gasket 50 to axially expand and compress between the expanded position 56 and the compressed position 58.

The circumferential lip 74 extends radially from the flexible portion 72 and comprises a rounded end 75 that is the furthest point from the connection between the circumferential lip 74 and the flexible portion 72. The circumferential lip 74 further comprises a first surface and a second surface (referred to herein as an inner surface 74a and an outer surface 74b) that are positioned on opposite sides of the circumferential lip 74. The rounded end 75 is positioned in between the inner surface 74a and the outer surface 74b (along the outer surface of the circumferential lip 74). The inner surface 74a and the outer surface 74b are substantially flat surfaces that are tapered toward each other (i.e., toward the rounded end 75). Accordingly, the circumferential lip 74 is thicker along the connection between the circumferential lip 74 and the flexible portion 72 than along the rounded end 75.

In the expanded position 56, the circumferential lip 74 is in the axially-extending position such that the rounded end 75 of the circumferential lip 74 is axially below the flexible portion 72, and the inner surface 74a and the outer surface 74b extend in a substantially axial manner, as shown in FIG. 1B. However, since the inner surface 74a and the outer surface 74b are tapered, the inner surface 74a and the outer surface 74b are also angled relative to the central axis 29 in this position. In particular, in the expanded position 56, both the inner surface 74a and the outer surface 74b (and thus the entire circumferential lip 74) are angled away from the central axis 29 in a direction from away the connection point between the circumferential lip 74 and the flexible portion 72, as shown in FIG. 3A.

In the compressed position 58, the circumferential lip 74 is in the radially-extending position such that the rounded end 75 of the circumferential lip 74 is substantially radially aligned with the flexible portion 72, and the inner surface 74a of the circumferential lip 74 extends radially, substantially parallel to the top surface 26 of the endplate 24, as shown in FIG. 1C. The outer surface 74b of the circumferential lip 74 also extends radially. However, due to the taper of the circumferential lip 74, the outer surface 74 is angled axially downwardly (in a direction from the connection point between the circumferential lip 74 and the flexible portion 72 toward the end 75) relative to a radial plane in the compressed position 58.

As shown in FIGS. 3A-3C, the gasket 50 (in particular the spring-loaded extension 71) is configured to axially compress, deform, or flex between the expanded position 56 and the compressed position 58, thereby functioning as a compression spring within the spin-on filter 21. By functioning as a biasing member with a full range of motion and that maintains the various seals while moving, the gasket 50 thereby eliminates the need to provide a spring (in particular a spring between the filter element and the nutplate) and a separate seal(s). Additionally, by being movable between two different positions (and functioning as a biasing member), the gasket 50 allows the spin-on filter 21 to have greater flexibility in its height stack-up capability (and to have a larger range of allowable stack-up height error) and to also form more consistent seals at a variety of different heights. By being movable between the expanded position 56 and the compressed position 58 (and securable within the spin-on filter 21 in any position therebetween), the gasket 50 is configured to accommodate and fit within a broad range of axial gaps in different filter assemblies (while still forming at least two seals, as described further herein).

When the gasket 50 is in the expanded position 56 (as shown in FIGS. 1B and 3A), the gasket 50 is not axially compressed or only minimally axially compressed, and the spring-loaded extension 71 is axially extended such that the axial height of the spring-loaded extension 71 (as well as the overall height of the gasket 50) is larger in the expanded position 56 (than in the compressed position 58). Accordingly, the gasket 50 extends axially further in the expanded position 56 than in the compressed position 58. In the expanded position 56, the end 75 of the circumferential lip 74 extends axially below the flexible portion 72, and the circumferential lip 74 is closer to the endplate 24 than the flexible portion 72.

As the gasket 50 moves from the expanded position 56 to the compressed position 58 (as shown in FIGS. 3A-3C) and the gasket 50 is partially compressed, the flexible portion 72 bends or flexes, which allows the spring-loaded extension 71 to move or rotate radially outwardly about the connection point between the flexible portion 72 and the circumferential lip 74 (as shown in FIG. 3B), moving the circumferential lip 74 (and the overall spring-loaded extension 71) from the axially-extending position to the radially-extending position. Accordingly, as the gasket 50 moves from the expanded position 56 to the compressed position 58, the axial height of the gasket 50 is reduced and the radial width (or outer diameter) of the gasket 50 is increased. As the spring-loaded extension 71 moves relative to the central body 61 (and the endplate 24 and the nutplate 34) between the expanded position 56 and the compressed position 58, the circumferential lip 74 moves between the axially-extending position and in the radially-extending position relative to the central body 61 (and the endplate 24 and the nutplate 34), and the central body 61 maintains substantially the same position relative to the endplate 24 and the nutplate 34 (i.e., extending axially between the upper portion and the lower portion of the central body 61 and between the endplate 24 and the nutplate 34).

When the gasket 50 is in the compressed position 58 (as shown in FIGS. 1C and 3C), the gasket 50 is fully axially compressed, and the spring-loaded extension 71 is axially compressed such that the axial height of the spring-loaded extension 71 (as well as the overall axial height of the gasket 50) is smaller or reduced in the compressed position 58 (than in the expanded position 56), as shown in FIG. 3C compared to FIG. 3A. In the compressed position 58, the flexible portion 72 is flexed, such that the circumferential lip 74 rotates and flares or pivots outwardly (in the radially-extending position) and the end 75 of the circumferential lip 74 is approximately radially aligned with the flexible portion 72. Accordingly, in the compressed position 58, the gasket 50 radially expands, extends, or flares further outward (relative to the expanded position 56) and the radial width of the spring-loaded extension 71 (as well as the overall radial width of the gasket 50) is larger or increased in the compressed position 58 (than the expanded position 56) due to the circumferential lip 74 pivoting radially outwardly about the connection point between the flexible portion 72 and the circumferential lip 74, as shown in FIG. 3C compared to FIG. 3A. As the end 75 of the circumferential lip 74 moves radially outwardly, the top surface of the circumferential lip 74 pivots radially inwardly, and the inner surface of the central body 61 (that forms the third seal 53) radially contracts.

In both the expanded position 56 and the compressed position 58 (and various positions in between), the gasket 50 is configured to axially and/or radially span a gap between two or more components within the filter assembly 20 that are aligned along the same axis (i.e., the central axis 29). By being movable between the expanded position 56 and the compressed position 58, the gasket 50 can accommodate and span a range of different sized axial gaps between two or more components within the filter assembly 20. In particular, as shown in FIGS. 1B-1C and 3A-3C, the sealing spring gasket 50 is positioned axially between (and axially spans different sized axial gaps between) the top surface 26 of the endplate 24 of the filter element 22 and the bottom surface 37 of the nutplate 34. The sealing spring gasket 50 (in particular the upper portion of the central body 61) is also positioned radially between (and radially spans a gap between) the inner surface of the nutplate through-hole 35 and an outer surface of the spud 44.

The gasket 50 is configured to form at least two seals (for example, three seals) at areas of contact with at least two other adjacent components (for example, with mating surfaces of three other components) of the filter assembly 20 to keep filtered and unfiltered fluids separated. In particular, the outer surfaces of the gasket 50 (in particular the sealing regions 51a, 52a, 53a) are configured to conform to the surfaces of adjacent components to form the various seals. Since the gasket 50 also functions as a biasing member and is biased to move from the compressed position 58 toward the expanded position 56, the gasket 50 maintains the at least two seals over a range of axial and radial motion of the gasket 50 as the gasket 50 moves between the expanded position 56 and the compressed position 58. The at least two seals may be radial and/or axial (or face) seals. By forming at least two seals (and due to the elastomeric material), the gasket 50 provides resistance to prevent internal rotation of the filter element 22 within the housing shell 33, such as when clear glass bowls are being screwed on or unscrewed, thereby reducing or eliminating the need for additional anti-rotation measures.

As shown in FIGS. 1B-1C and 3A-3C, the gasket 50 (in particular the spring-loaded extension 71) forms and maintains a first seal 51 with a first component (e.g., the endplate 24) along the first sealing region 51a and a second seal 52 with a second component (e.g., the nutplate 34) along the second sealing region 52a. The gasket 50 (in particular the central body 61) also forms and maintains a third seal 53 with a third component (e.g., the spud 44) along the third sealing region 53a. The first seal 51 and the second seal 52 are both at least partially axial seals, and the third seal 53 is at least a partially a radial seal. As referred to herein, axial seals may include a radial component, but are primarily more axial than radial. Similarly, radial seals may include an axial component, but are primarily more radial than axial. Each of the first seal 51, the second seal 52, and the third seal 53 are perimeter seals extending about the entire perimeter of the gasket 50.

FIGS. 3A-3C show the gasket 50 moving between the expanded position 56 and the compressed position 58. As shown, the gasket 50 is configured to maintain each of the first seal 51, the second seal 52, and the third seal 53 as the gasket 50 is axially compressed (or axially expands) (i.e., while the gasket 50 (in particular the spring-loaded extension 71) moves between the expanded position 56 and the compressed position 58). To maintain each of the seals 51, 52, 53 during movement, the respective sealing surfaces of the gasket 50 are radiused or curved, which allows the seals 51, 52, 53 to move as the gasket 50 moves.

For the first seal 51, the first sealing region 51a, which is defined by the bottom surface 77 of the spring-loaded extension 71, forms the first seal 51 with the first component (referred to herein as the endplate 24). Accordingly, the first sealing region 51a (i.e., the bottom surface 77 of the spring-loaded extension 71) is curved or radiused and concave to allow the gasket 50 to form the first seal 51 with the endplate 24 as the gasket 50 moves between the expanded position 56 and the compressed position 58. In particular, in the expanded position 56 (as shown in FIG. 3A), the end 75 of the circumferential lip 74 forms the first seal 51 with the endplate 24. As the gasket 50 is compressed and changes shape and moves partially toward the compressed position 58 (as shown in FIG. 3B), the location of the first seal 51 along the bottom surface 77 (and along the first sealing region 51*a*) moves from the tip of the end 75 of the circumferential lip 74 toward and around a rounded edge of the circumferential lip 74 (that is between the tip of the end 75 and the inner surface 74*a* of the circumferential lip 74). As the gasket 50 is further compressed and into the compressed position 58 (as shown in FIG. 3C), the entire inner surface 74*a* of the circumferential lip 74 is flat and pressed against the top surface 26 of the endplate 24 (as well as the bottom surface of the flexible portion 72). Accordingly, in the compressed position 58, the inner surface 74*a* of the circumferential lip 74 and optionally also the bottom surface of the flexible portion 72 form the first seal 51 with the top surface 26 of the endplate 24. Further, as the gasket 50 moves from the expanded position 56 to the compressed position 58, the first seal 51 also moves radially outwardly along the top surface 26 of the endplate 24.

For the second seal 52, the second sealing region 52*a*, which is defined by the top surface 76 of the spring-loaded extension 71, forms the second seal 52 with the second component (referred to herein as the nutplate 34). Accordingly, the second sealing region 52*a* (i.e., the top surface 76 of the spring-loaded extension 71) is curved or radiused and concave to allow the gasket 50 to form the second seal 52 with (and thus maintain contact with) the nutplate 34 as the spring-loaded extension 71 of the gasket 50 moves between the expanded position 56 and the compressed position 58. In particular, the top surface 76 of the spring-loaded extension 71 along the flexible portion 72 and/or along the circumferential lip 74, which corresponds to the second sealing region 52*a*, forms the second seal 52 with the nutplate 34 (with, for example, a convex portion of the bottom surface 37 of the nutplate 34). In the expanded position 56 (as shown in FIG. 3A), the top surface of the flexible portion 72 (or the top surface at the connection point between the flexible portion 72 and the circumferential lip 74) forms the second seal 52 with the nutplate 34. As the gasket 50 is compressed and changes shape and moves partially toward the compressed position 58 (as shown in FIG. 3B), the top surface 76 curves further inwardly (i.e., is increasingly more concave), which moves the top surface 76 radially inwardly. Accordingly, the location of the second seal 52 moves radially outwardly along the top surface 76 (and along the second sealing region 52*a*) toward the top surface of the circumferential lip 74 as the circumferential lip 74 rotates radially outwardly. As the gasket 50 is further compressed and moves into the compressed position 58 (as shown in FIG. 3C), the respective top surfaces of the flexible portion 72 and/or the circumferential lip 74 forms the second seal 52.

For the third seal 53, the gasket through-hole 55 is configured to receive the spud 44 such that the spud 44 extends through the gasket through-hole 55, and the third sealing region 53*a*, which is defined by the inner surface of the central body 61, forms the third seal 53 with the outer surface of the spud 44. As shown in FIGS. 3A-3C, the top surface of the central body 61 (and thus the third sealing region 53*a*) may be curved radially inwardly to maintain the third seal 53 as the spring-loaded extension 71 moves and causes the rest of the gasket 50 to move accordingly. The top surface of the central body 61 may be sandwiched between the spud 44 and the nutplate through-hole 35 when assembled.

The gasket 50 may only be minimally compressed in the expanded position 56 (as shown in FIG. 3A) to produce the necessary sealing forces at each of the locations of the seals (i.e., the seals 51, 52, 53) and maintain a separation of fluids under the pressures experienced during filtration and fluid flow. When the gasket 50 is axially loaded and compressed in any amount between and including the expanded position 56 and the compressed position 58, the gasket 50 exerts a positive and opposite axial reactive force due to the geometry of the gasket 50 and its resulting bias to move toward the expanded position 56 from the compressed position 58. Once the gasket 50 is compressed beyond its "closed height" (where the "closed height" refers to when the flexible portion 72 cannot flex, move, or rotate the circumferential lip 74 any farther to accommodate more axial load, as shown in FIG. 3C), the elastomeric material of the gasket 50 itself further supports the axial load, and the gasket 50 further deforms or displaces to support the load. The seals 51, 52, 53 are still maintained when the gasket 50 is maximally compressed.

When the gasket 50 in the expanded position 56 (or a position in between the expanded position 56 and the compressed position 58), the gasket 50 defines a main cavity or channel 82 along the concave portion of the bottom surface 77, as shown in FIGS. 1B-1C and 4. When the gasket 50 is in the compressed position 58, the channel 82 may either be significantly smaller (as shown in FIG. 1C) or completely collapsed (as shown in FIG. 3C). The channel 82 is defined by the concave portion of the bottom surface 77 of the spring-loaded extension 71 (in particular the inner surface of the spring-loaded extension 71 and the bottom surface of the flexible portion 72), the outer surface of the central body 61, and the top surface 26 of the endplate 24 (when assembled). The channel 82 has an approximately semi-circular cross-section.

When the gasket 50 is attached to the endplate 24, the top surface 26 of the endplate 24 partially closes off the bottom of the channel 82. In the expanded position 56, the first seal 51 (formed between the end 75 of the circumferential lip 74 and the top surface 26 of the endplate 24) defines the radial outer edge or outermost perimeter of the channel 82. The gaps 65 between the ribs 63 are fluidly connected to the channel 82 and thus the ribs 63 prevent a suction or vacuum effect from occurring within the channel 82 (between the gasket 50 and the endplate 24) and prevent fluid from being trapped in the channel 82 between the bottom surface 77 of the gasket 50 and the top surface 26 of the endplate 24 as the gasket 50 is moved relative to the endplate 24 between the expanded position 56 and the compressed position 58.

Because the ribs 63 of the central body 61 of the gasket 50 radially space apart the outer surface of the central body 61 from the inner surface of the endplate 24 (defining the endplate through-hole 25), a gap 65 is created between the outer surface of the central body 61 and the inner surface of the endplate 24. The gap 65 defines a fluid flow passage between the endplate 24 and the central body 61 to allow fluid to enter into or exit from the channel 82 (from a central region of the filter element 22) as the gasket 50 is moved between the expanded position 56 and the compressed position 58. Without the ribs 63, a suction effect may occur within the channel 82 that reduces the ability of the gasket 50 to effectively function as a biasing member.

In the expanded position 56, the channel 82 is filled with a fluid (e.g., air). As the gasket 50 is axially compressed toward and into the compressed position 58, the volume of the channel 82 decreases, and the fluid in the channel 82 is allowed to flow out from the channel 82 (and out of the entire gasket 50) through the gap 65. Conversely, as the gasket 50 is allow to move back from the compressed position 58 toward the expanded position 56, the volume of the channel 82 increases, and fluid flows into the channel 82 through the gap 65.

Figure 6:
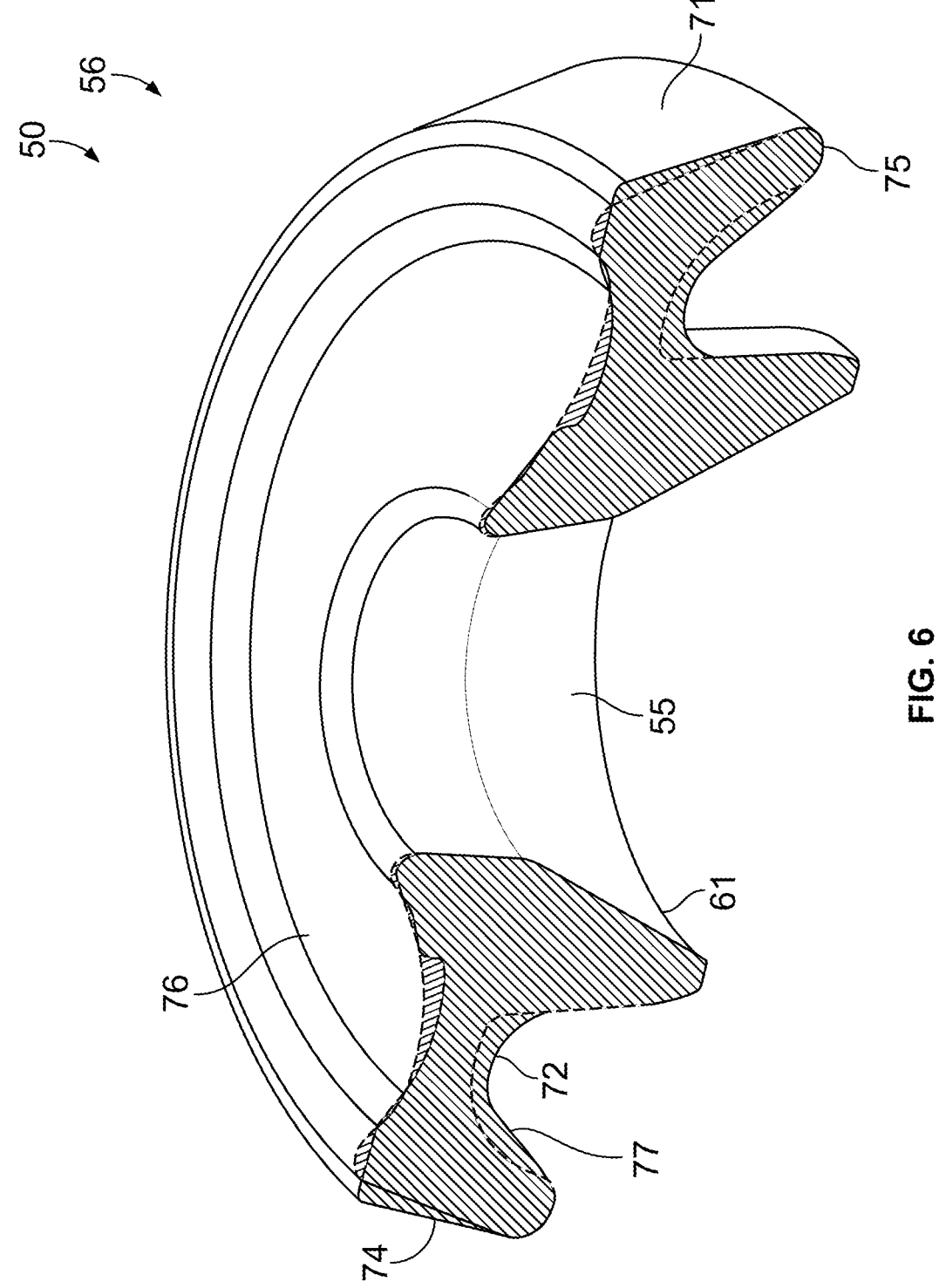
FIG. 6 is a cross-sectional, perspective view of possible geometric variations of the gasket of the spin-on filter of FIG. 1A.

FIG. 6 shows potential geometric variations of the gasket 50 to tailor the properties of the gasket 50 according to its particular use and application. For example, by adding or removing material at different critical areas of the gasket 50, the gasket 50 is optimized to reduce material strain, increase flexibility, enhance the formation of the seals 51, 52, 53, and optimize the configuration of the gasket 50 according to the varying diameters of the mating surfaces of the endplate 24, the nutplate 34, and the spud 44. The various curvatures and dimensions may be altered according to the desired configuration while maintaining the general structure of the gasket 50 (e.g., the general structure of the central body 61 and the spring-loaded extension 71). For example, the curvature of the bottom surface 77 of the spring-loaded extension 71, the height of the circumferential lip 74, the width of the top portion of the circumferential lip 74, the diameter of the gasket through-hole 55, the height of the central body, the outer diameter of the central body 61, and/or the outer dimeter of the gasket 50 may be modified according to the desired use and configuration. However, the various features (including, but not limited to, the flexible portion 72 and the circumferential lip 74 of the spring-loaded extension 71, the structural relationship between the spring-loaded extension 71 and the central body 61, and the ability of the gasket 50 to function as a biasing member and form the various seals described herein) are maintained with any changes to the curvatures and dimensions.

Each of the various embodiments disclosed herein may have any of the aspects, features, components, and configurations of the other embodiments, except where noted otherwise.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A spin-on filter comprising:

a housing shell;

a filter element positionable within the housing shell and comprising a filter media and an endplate defining an endplate through-hole;

a nutplate positionable within the housing shell defining a nutplate through-hole; and a gasket comprising:

a central body defining a gasket through-hole, and a spring-loaded extension circumferentially surrounding and extending radially from the central body, the spring-loaded extension being axially flexible between an expanded position and a compressed position, the spring-loaded extension forming and maintaining a first seal with the endplate and maintaining contact with the nutplate as the spring-loaded extension moves between the expanded position and the compressed position, wherein the endplate through-hole, the nutplate through-hole, and the gasket through-hole are axially aligned, and wherein the nutplate through-hole and the gasket through-hole at least partially receive a spud, the central body of the gasket forming a third seal with the spud and maintaining the third seal with the spud as the spring-loaded extension moves between the expanded position and the compressed position.

2. A spin-on filter comprising:

a housing shell;

a filter element positionable within the housing shell and comprising a filter media and an endplate, the endplate defining an endplate through-hole;

a nutplate positionable within the housing shell, the nutplate defining a nutplate through-hole; and a gasket comprising:

a central body defining a gasket through-hole, at least a portion of a lower portion of the central body extending into the endplate through-hole and at least a portion of an upper portion of the central body extending into the nutplate through-hole, and a spring-loaded extension circumferentially surrounding and extending radially from the central body, the spring-loaded extension being axially flexible between an expanded position and a compressed position, the spring-loaded extension forming and maintaining a first seal with the endplate and maintaining contact with the nutplate as the spring-loaded extension moves between the expanded position and the compressed position, wherein the endplate through-hole, the nutplate through-hole, and the gasket through-hole are axially aligned with each other.

3. The spin-on filter of claim 2, wherein a bottom surface of the spring-loaded extension forms the first seal with the endplate, and a top surface of the spring-loaded extension forms a second seal with the nutplate.

4. The spin-on filter of claim 3, wherein the bottom surface and the top surface of the spring-loaded extension are concave along at least a portion of their respective radial lengths in the expanded position.

5. The spin-on filter of claim 2, wherein the gasket extends further axially in the expanded position than in the compressed position.

6. The spin-on filter of claim 2, wherein the spring-loaded extension comprises a flexible portion extending radially from the central body and a circumferential lip extending radially from the flexible portion.

7. The spin-on filter of claim 6, wherein, in the expanded position, an end of the circumferential lip extends axially below the flexible portion, and wherein, in the compressed position, the end of the circumferential lip is approximately axially aligned with the flexible portion.

8. The spin-on filter of claim 6, wherein a connection between the central body and the spring-loaded extension is tapered such that a thickness of the flexible portion is gradually reduced as the flexible portion extends radially outward from the central body to a central portion of the flexible portion.

9. The spin-on filter of claim 6, wherein the circumferential lip is positionable in an axially-extending position in which an end of the circumferential lip is axially below the flexible portion and a radially-extending position in which the end of the circumferential lip is substantially axially aligned with the flexible portion.

10. The spin-on filter of claim 2, wherein the gasket is a single, unitary component.

11. The spin-on filter of claim 2, wherein an upper portion of the central body is tapered such that a thickness of the central body axially above the spring- loaded extension is smaller than a thickness of the central body that is axially aligned with the spring-loaded extension.

12. The spin-on filter of claim 2, wherein the spring-loaded extension is biased to move from the compressed position towards the expanded position.

13. The spin-on filter of claim 2, wherein, when the spring- loaded extension moves between the expanded position and the compressed position, the spring-loaded extension moves relative to the endplate and the nutplate, and the central body maintains substantially the same position relative to the endplate and the nutplate.

14. The spin-on filter of claim 2, wherein an axial height of the gasket is smaller and a radial width of the gasket is larger in the compressed position than in the expanded position.

15. A spin-on filter comprising:

a housing shell;

a filter element positionable within the housing shell and comprising a filter media and an endplate, an inner surface of the endplate defining an endplate through-hole;

a nutplate positionable within the housing shell; and a gasket comprising:

a central body positioned at least partially within the endplate through-hole, the central body comprising at least one rib along an outer surface of the central body, the at least one rib forming a gap between the outer surface of the central body and the inner surface of the endplate, and a spring-loaded extension circumferentially surrounding and extending radially from the central body, the spring-loaded extension being axially flexible between an expanded position and a compressed position, the spring-loaded extension forming and maintaining a first seal with the endplate and maintaining contact with the nutplate as the spring-loaded extension moves between the expanded position and the compressed position.

16. The spin-on filter of claim 15, wherein a channel is defined between a bottom surface of the spring-loaded extension, an outer surface of the central body, and a top surface of the endplate, wherein the gap is fluidly connected to the channel.

\* \* \* \* \*